(12) United States Patent
Green et al.

(10) Patent No.: US 9,778,860 B2
(45) Date of Patent: Oct. 3, 2017

(54) RE-TRIM OF FREE SPACE WITHIN VHDX

(75) Inventors: Dustin Green, Redmond, WA (US); John Starks, Seattle, WA (US); Neal Christiansen, Bellevue, WA (US); Chung Lang Dai, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/612,517

(22) Filed: Sep. 12, 2012

(65) Prior Publication Data

US 2014/0074776 A1    Mar. 13, 2014

(51) Int. Cl.
*G06F 17/30* (2006.01)
*G06F 3/06* (2006.01)

(52) U.S. Cl.
CPC ............ *G06F 3/0614* (2013.01); *G06F 3/061* (2013.01); *G06F 3/064* (2013.01); *G06F 3/065* (2013.01); *G06F 3/0679* (2013.01)

(58) Field of Classification Search
CPC ............ G06F 11/1048; G06F 11/106; G06F 11/1604; G06F 11/2038; G06F 12/121; G06F 12/0866; G06F 11/1068
See application file for complete search history.

(56) References Cited

U.S. PATENT DOCUMENTS

| | | | |
|---|---|---|---|
| 5,043,866 A | 8/1991 | Myre, Jr. et al. | |
| 6,304,983 B1 | 10/2001 | Lee et al. | |
| 6,545,833 B1 | 4/2003 | Ee et al. | |
| 6,578,041 B1 | 6/2003 | Lomet | |
| 6,697,881 B2 | 2/2004 | Cochran | |
| 7,107,385 B2 | 9/2006 | Rajan et al. | |
| 7,299,333 B2 | 11/2007 | Mizuno et al. | |
| 7,373,548 B2 | 5/2008 | Reinhardt et al. | |
| 7,386,662 B1 * | 6/2008 | Kekre et al. ........ | 711/113 |
| 7,447,854 B1 | 11/2008 | Cannon | |
| 7,567,985 B1 | 7/2009 | Comay et al. | |
| 7,694,105 B2 | 4/2010 | Sanvido | |
| 7,783,833 B2 | 8/2010 | Kumagai | |

(Continued)

FOREIGN PATENT DOCUMENTS

| | | |
|---|---|---|
| JP | 2004-185349 A | 7/2004 |
| JP | 2004-295870 A | 10/2004 |

(Continued)

OTHER PUBLICATIONS

International Patent Application No. PCT/US2012/027645: International Search Report and Written Opinion dated Sep. 25, 2012, 9 pages.

(Continued)

*Primary Examiner* — Mariela Reyes
*Assistant Examiner* — Courtney Harmon
(74) *Attorney, Agent, or Firm* — Baker & Hostetler LLP

(57) ABSTRACT

An invention is disclosed for maintaining out-of-band metadata for data. In embodiments of the invention, an upper layer of a storage stack determines that the metadata of a lower layer of that storage stack may have become out of sync. In response, the upper layer may issue a series of commands to the lower layer based on the metadata. In other embodiments of the invention, an offload-copy operation on data may also transfer out-of-band metadata so that it is applied to the data at the destination.

20 Claims, 5 Drawing Sheets

(56) References Cited

U.S. PATENT DOCUMENTS

| | | |
|---|---|---|
| 7,801,852 B2 | 9/2010 | Wong et al. |
| 7,831,550 B1 | 11/2010 | Pande et al. |
| 7,886,115 B2 | 2/2011 | Sanvido et al. |
| 7,996,636 B1 | 8/2011 | Prakash et al. |
| 8,046,550 B2 | 10/2011 | Feathergill |
| 8,261,267 B2 | 9/2012 | Iwamatsu et al. |
| 8,301,854 B2 | 10/2012 | Nakagawa et al. |
| 8,307,177 B2 | 11/2012 | Prahlad et al. |
| 8,332,370 B2 | 12/2012 | Gattegno et al. |
| 8,397,046 B2 | 3/2013 | Kudo |
| 8,688,632 B2 | 4/2014 | Niki |
| 8,825,936 B2 | 9/2014 | Wade et al. |
| 8,850,516 B1 | 9/2014 | Hrebicek et al. |
| 2002/0178335 A1 | 11/2002 | Selkirk et al. |
| 2003/0058238 A1 | 3/2003 | Doak et al. |
| 2003/0105810 A1 | 6/2003 | McCrory et al. |
| 2005/0071388 A1* | 3/2005 | Fienblit .............. G06F 11/2074 |
| 2006/0218544 A1 | 9/2006 | Chakraborty et al. |
| 2007/0244938 A1 | 10/2007 | Michael et al. |
| 2007/0260831 A1 | 11/2007 | Michael et al. |
| 2008/0104345 A1 | 5/2008 | Maruyama et al. |
| 2008/0120470 A1 | 5/2008 | Dhamankar et al. |
| 2008/0147755 A1 | 6/2008 | Chapman |
| 2008/0155223 A1 | 6/2008 | Hiltgen et al. |
| 2008/0177809 A1 | 7/2008 | Murayama et al. |
| 2009/0157942 A1 | 6/2009 | Kulkarni |
| 2009/0198731 A1 | 8/2009 | Noonan, III |
| 2009/0282101 A1 | 11/2009 | Lim et al. |
| 2010/0042796 A1 | 2/2010 | Vasilevsky et al. |
| 2010/0070725 A1 | 3/2010 | Prahlad et al. |
| 2010/0122248 A1 | 5/2010 | Robinson et al. |
| 2010/0125705 A1* | 5/2010 | Mehra .................. G06F 3/0608 711/114 |
| 2010/0138832 A1 | 6/2010 | Kim et al. |
| 2010/0211737 A1* | 8/2010 | Flynn et al. .................. 711/114 |
| 2010/0228913 A1 | 9/2010 | Czezatke et al. |
| 2010/0235831 A1 | 9/2010 | Dittmer |
| 2010/0241785 A1 | 9/2010 | Chen et al. |
| 2010/0250630 A1 | 9/2010 | Kudo |
| 2010/0299368 A1 | 11/2010 | Hutchins et al. |
| 2010/0306467 A1 | 12/2010 | Pruthi et al. |
| 2010/0333090 A1 | 12/2010 | Wright et al. |
| 2011/0055406 A1 | 3/2011 | Piper et al. |
| 2011/0072059 A1 | 3/2011 | Guarraci |
| 2011/0179414 A1 | 7/2011 | Goggin et al. |
| 2011/0197022 A1 | 8/2011 | Green et al. |
| 2012/0042141 A1 | 2/2012 | Tatara et al. |
| 2012/0079583 A1 | 3/2012 | Christiansen et al. |
| 2012/0110259 A1* | 5/2012 | Mills et al. .................. 711/113 |
| 2012/0110281 A1 | 5/2012 | Green et al. |
| 2012/0233434 A1 | 9/2012 | Starks et al. |
| 2013/0117223 A1* | 5/2013 | Niki .............................. 707/610 |

FOREIGN PATENT DOCUMENTS

| | | |
|---|---|---|
| JP | 2005-128861 A | 5/2005 |
| JP | 2007-279883 A | 10/2007 |
| JP | 2009-533777 A | 9/2009 |
| JP | 2010-033206 | 2/2010 |

OTHER PUBLICATIONS

"FSCTL_FILE_LEVEL_TRIM Control Code", Retrieved on: Jul. 11, 2012, Available at: http://msdn.microsoft.com/en-us/library/windows/hardware/hh451098(v=vs.85).aspx.

"TRIM/UNMAP Support in Windows Server 2012 & Hyper-V/VHDX", Published on: May 23, 2012, Available at: http://workinghardinit.wordpress.com/2012/05/23/trimunmap-support-in-windows-server-2012-hyper-vvhdx/.

Campbell, Lisa, "Hyper-V Scalability Evident in Its New Virtual Disk Format", Published on: Jul. 9, 2012, Available at: http://www.unitrends.com/hyper-v-backup/hyper-v-scalability-evident-virtual-disk-format/.

"Deploying Virtual Hard Disk Images", www.technet.microsoft.com-en-us-library-dd363560(WS.10,printer).aspx, accessed Dec. 8, 2010, 1-8.

"Using Differencing Disks", www.technet.microsoft.com-en-us-library-cc720381(WS.10,printer).aspx, accessed Dec. 8, 2010, 1-3.

"Troubleshooting Parent Virtual Disk Errors in Fusion", http:--kb.vmware.com-selfservice-microsites-search.do?language=en_US&cmd=displayKC&externalId=1018832, accessed Feb. 23, 2011, 1-7.

"Virtual Hard Disk Image Format Specification", Microsoft Corporation, Oct. 11, 2006, 1-8.

"VMWare Recovering Vmware Snapshot after Parent Changed", http:--it.it-larsen.dk-index.php?option=com_content&view=article&id=6:vmware-recovering-vmware-snapshot-after-parent-changed&catid=1:vmware-35&Itemid=4, accessed Feb. 23, 2011, 1-3.

Kerr, "The Virtual Disk API in Windows 7", http:--msdn.microsoft.com-en-us-magazine-dd569754.aspx, accessed Feb. 23, 2011, 1-7.

Yang et al., "Windows Server 2008", Virtual Hard Disk Performance, A Microsoft White Paper, Mar. 2010, 1-35.

"How to Resize a Microsoft Virtual Hard Drive (VHD)", http:--sysadmingeek.com-articles-how-to-resize-a-microsoft-virtual-hard-drive-vhd-file-, accessed Jan. 24, 2011, 1-10.

Agarwal, "Distributed Checkpointing of Virtual Machines in Xen Framework", Thesis Submitted in Partial Fulfillment of the Requirements for the Degree of Master of Technology in Computer Science and Engineering, Department of Computer Science and Engineering, Indian Institute of Technology, Kharagpur, May 2008, 1-44.

Elnozahy et al., "The performance of Consistent Checkpointing", 11th Symposium on Reliable Distributed Systems, Houston, TX, USA, Oct. 5-7, 1992, 39-47.

International Patent Application No. PCT/US2011/055586, International Search Report dated May 31, 2012, 8 pages.

International Patent Application No. PCT/US2011/055591, International Search Report dated May 31, 2012, 8 pages.

* cited by examiner

RE-TRIM OF FREE SPACE WITHIN VHDX

BACKGROUND

There are a type of persistent storage devices known as solid-state drives (SSDs). SSDs typically use flash memory for storage, as opposed to the magnetic-based storage means found in many mechanical hard drives. A problem exists with SSDs because they require relatively significant time to write to the drive's blocks when those blocks have not been erased since they were previously written to. Additionally, many computer systems are configured so that when data is erased, that data is merely noted as being erased in the file system, and that data is not actually erased on the drive. That data may then stay on the drive until new data is written to its blocks. A solution to this problem is TRIMming (sometimes referred to without capital letters, as trimming), where the operating system indicates to a SSD which data blocks are no longer used and may be erased. The SSD may receive this TRIM command and mark the associated logical block addresses (LBAs) as trimmed. At this point, the SSD may determine not to copy the data from those LBAs during garbage collection (a SSD frequently can erase only a relatively large chunk of data at once, so then copies out the valid data from that portion so that it may erase the unused portion). In this manner, a block may be erased long before a new write is made to it, significantly speeding up the completion of that write operation. The total number of internal IO operations necessary to complete the write is also reduced, which can increase the life expectancy of the SSD. A similar command called UNMAP is typically used for similar purposes, and also to reclaim physical storage space in thin-provisioned storage environments.

Despite these advantages of TRIM and UNMAP, they also have several problems, some of which are well known.

SUMMARY

Before addressing these problems of TRIM, some terminology will be discussed. Additionally, the principles of the TRIM embodiments described herein may be generally applied to UNMAP operations and other similar operations.

VHD. The embodiments described herein may involve a virtual hard disk file (e.g. VHD or VHDX), which is a file that is used to represent a hard disk (e.g. to a virtual machine), and may contain file system structures (e.g., directories and files). At times, portions of a virtual hard disk file may not be presently used to back any portion of the virtual disk represented by the file (i.e. VHD level free space). Also, portions of the represented virtual disk may presently correspond to file system free space (file system level free space). It may be appreciated that the present techniques may be more generally applied to files or arbitrary data formats that have both space that is in use and space that is not in use, and that there is a process that is able to examine the file and identify these used and unused portions. Additionally, it may be appreciated that these techniques may be applied more generally to meta-data maintenance commands, of which TRIM is one such command.

Layer and Storage Container. As used herein, a "layer" may be considered to be a layer of a storage container, and a "storage container" may be considered to be a file, logical disk, data storage format, data item storage format, database storage format, abstract data view, or the like. That is, a "layer of a storage container" may contain a layer that at least partially implements a storage container abstraction, possibly with help from other layers, and also layers that implement storage container features. Examples of layers include implementations of abstractions, such as a file, volume snapshot, partition, logical disk, logical disk data layer (e.g., a VHD), and the like. Examples of layers also include implementations of features such as data de-duplication, data replication (near-line, asynchronous, and/or distributed), data mirroring, RAID (redundant array of inexpensive disks) or RAID-like techniques, parity-based resiliency, mirroring-based resiliency, wear-leveling, data snapshotting, and the like. Examples of layers also include database data storage formats, email data storage formats, and the like. Examples of layers also include data transformation and/or caching layers, such as cached queries, data storage layers implemented on top of key-value stores, and a data format parser (including a file parser). That is, embodiments of the present invention may apply to a layer that knows of something semantically relevant about the structure, purpose, or use of data that is just stored by a layer below.

Out-of-Band Metadata. As used herein, "out-of-band metadata" may refer to metadata that is held by a upper layer logically separate from its main data (in a lower layer)—separate in the sense that at a conventional copy that performs a read of the main data followed by a write of the main data would not copy the metadata. In embodiments of the present invention, out-of-band metadata may be ephemeral, in the sense that a layer is not strictly required to retain the metadata. In other embodiments, a layer may rely on these techniques and provide only an ephemeral implementation of a type of metadata that would have otherwise required the layer to provide retained implementation of the type of metadata.

In embodiments, out-of-band metadata comprises metadata stored on the upper layer, where corresponding payload data is stored on the lower layer. In embodiments, out-of-band metadata comprises metadata stored on the lower layer in a different physical location than corresponding payload data stored on the lower layer.

In embodiments, the out-of-band metadata may be out-of-band range-based metadata. Out-of-band range-based metadata may relate to storage containers that are offset-based, and where range-based metadata may be derived from an item-based format parser that implements an upper layer, but do not apply to an item-based metadata exposed upward from such a layer.

Returning to the problems with TRIM, one such problem may be seen in the VHD context. On an ongoing basis, portions of a VHD file that become free, but are still part of the VHD file, are TRIMmed, so that the underlying storage layer can track those ranges as trimmed (or unmapped). However, when that VHD file is copied or imaged to another drive, the TRIM information is lost, and the entire destination VHD file is stored in the new location.

More generally, a problem with TRIM and other technologies that set out-of-band metadata is that out-of-band metadata that is initially set by upper layers of an overall storage and file system stack may not be retained forever as various operations are performed at various layers of the stack, especially when these operations involve copying of data. When out-of-band metadata in lower layers is in sync, overall efficiency is improved. There are ways in which this out-of-band metadata in a lower layer may fall out of sync with layers above, in contrast to the data contained in lower layers, which may be retained much more reliably. Such out-of-band metadata often cannot be queried from lower layers, or cannot be queried at the same resolution at which it was initially set. Properly in-sync out-of-band metadata provides improved performance and possibly other benefits, and these benefits are not realized whenever the out-of-band metadata has fallen out of sync for any reason. In addition, many layers in the middle of the overall stack may have set out-of-band metadata over time, and layers in the middle of the overall stack may also implement fan-out or translation mechanisms which would force any out-of-band metadata query to be an approximation (so just querying and setting as data is copied would not necessarily convey the full fidelity of out-of-band metadata). Also, middle layers may deal with types of out-of-band metadata not known by, or not even anticipated by, the layers above. Also, some out-of-band metadata may have never been set by layers above—instead it was generated by lower layers internally (for example, information tracking which ranges have been frequently accessed in the past, or information related to access patterns previously seen from above).

Embodiments of the present invention may be implemented to (1) re-establish out-of-band metadata by re-issuing metadata maintenance commands from above; (2) determine, by an upper layer, that out-of-band metadata of a lower layer may have been lost or otherwise become out-of-sync; (3) during an offloaded copy operation, apply out-of-band metadata of the source to the destination; and (4) apply token-based copy offload to items (rather than sectors).

In an embodiment, a system implements re-establishing out-of-band metadata by re-issuing metadata maintenance commands from above. Such a system has a storage stack comprising an upper layer and a lower layer. The upper layer may determine that out-of-band metadata for the lower layer may have become out-of-sync. The upper layer then determines a set of metadata maintenance commands for the lower layer, and determines these commands regardless of what metadata maintenance commands have already been issued, and regardless of whether a range of the lower layer has recently become free. The upper layer then sends these maintenance commands to the lower layer, which implements them to modify the data and/or metadata stored in the lower layer.

In an embodiment, a system implements applying out-of-band metadata of a source to a destination during an offload copy operation. Such a system has a storage stack comprising an upper layer (or a layer acting as a copy provider) and a lower layer (which serves as the source), and there is also a destination (which may be part of the source storage stack, or a different storage stack). In response to receiving an indication to copy data from the source to the destination, the system may determine whether the out-of-band metadata for the data to be copied is appropriate to copy to the destination (e.g., TRIM commands may be appropriate to transfer to the destination, whereas heat map commands may not, where the copy may be used solely for backup). The system may generate a small token based on the data to be copied and store it to a buffer. A process that handles writing data to the destination may receive access to the token, and then write the data indicated by the token to the destination. Additionally, the upper layer may determine the relevant out-of-band metadata based on a range or ranges identified in the copy request. The upper layer may then copy the relevant out-of-band metadata to a corresponding upper layer for the destination.

DETAILED DESCRIPTION OF ILLUSTRATIVE EMBODIMENTS

Figure 1:
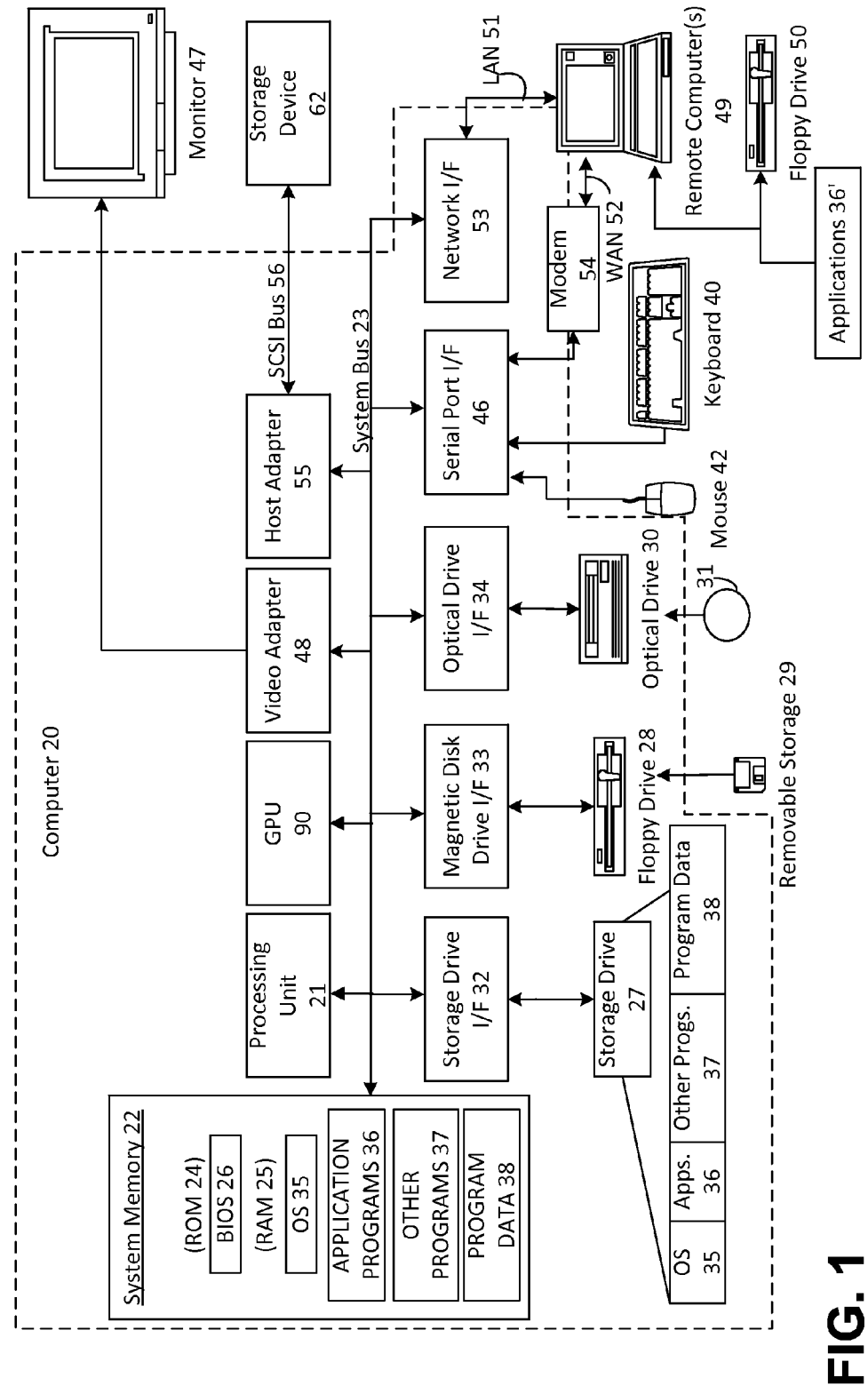
FIG. 1 depicts an example computer in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicatively couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
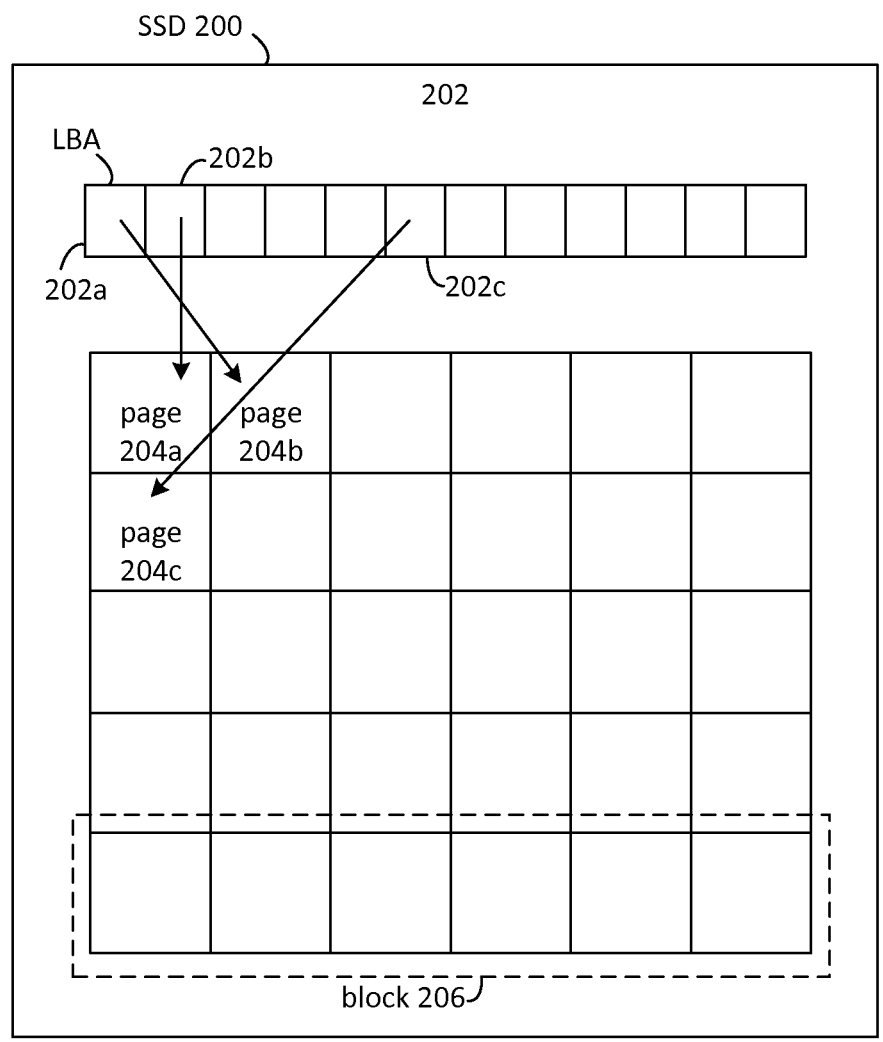
FIG. 2 depicts an example SSD on which TRIM operations may be performed.

FIG. 2 depicts an example SSD 200 on which TRIM operations may be performed. In embodiments, SSD 200 may be storage drive 27 of FIG. 1. A SSD is a logically contiguous storage device that may be implemented using flash memory, and a controller that controls the operations performed on that flash memory, including reads to and writes from that flash memory. A SSD may be implemented as an array of 4 KB pages. The controller may use logical block addressing (LBA) 202 to maintain a logical arrangement of the stored data that is separate from the physical arrangement of the stored data. The controller may maintain a LBA 202 mapping between the logical arrangement and physical arrangement of the data. Then, e.g., when data is moved physically during garbage collection, the controller may keep the data in the same logical position, and change the corresponding pointer in the LBA mapping to point to the new physical location.

As depicted, LBA 202 contains three pointers to pages of the SSD's physical memory: LBA 202*a* addresses page 204*b*, LBA 202*b* addresses page 204*a*, and LBA 202*c* addresses page 204*c*. This addressing may change over time. For instance, LBA 202*a* may be modified to address page 204*a* (which LBA 204*b* also addresses it). Pages are grouped together into blocks, like block 206. In many SSDs, the smallest size of data that may be erased is a block. So, if just one page in block 206 is to be erased, all of the pages in block 206 that are to remain un-erased need to be copied to other parts of SSD 200, and the addressing in LBA 202 needs to be updated. An advantage of TRIM commands stems from the fact that the copy portion of a SSD's erase operation is relatively time expensive. However, if a TRIM command has identified particular pages as being erasable, then those pages do not need to be copied out of the block when the block is erased, saving time on the erase operation.

Figure 3:
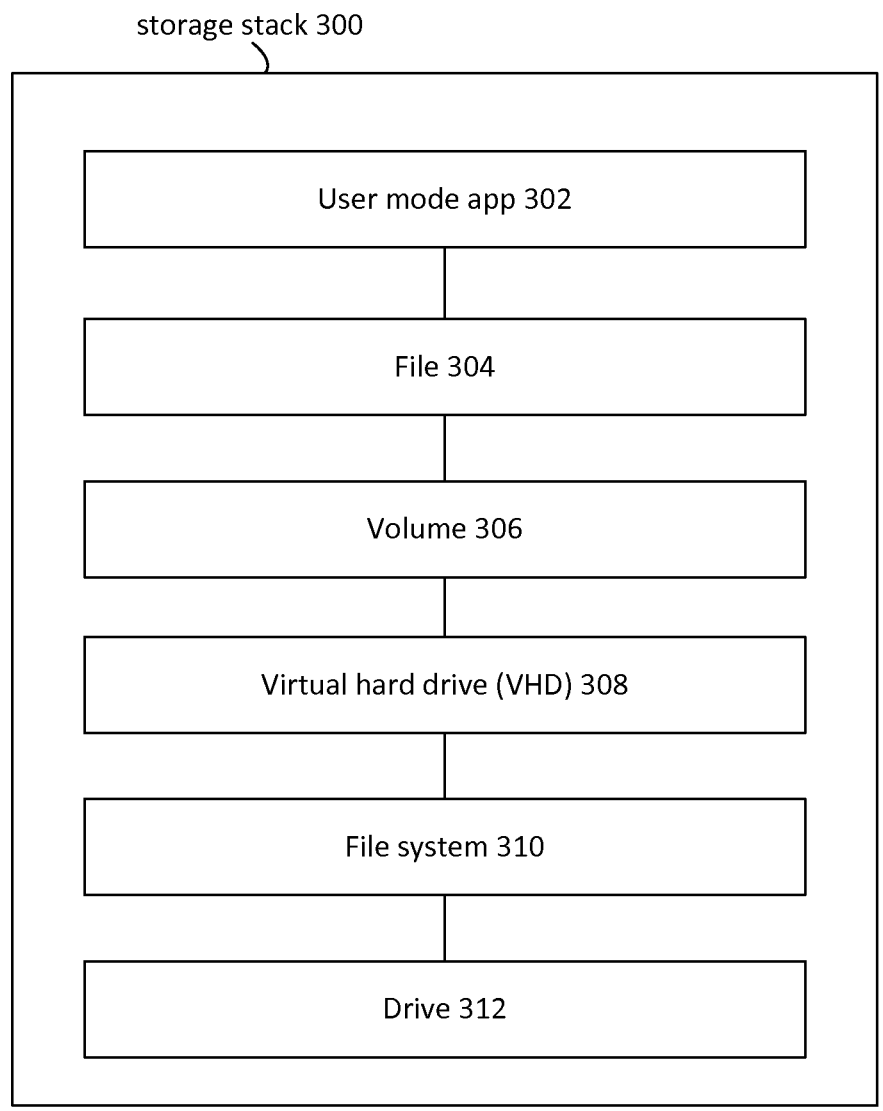
FIG. 3 depicts an example storage stack in which embodiments of the invention may be implemented.

FIG. 3 depicts an example storage stack in which embodiments of the invention may be implemented. In embodiments, storage stack 300 may be implemented on computer 20 of FIG. 1 and comprise SSD 200 of FIG. 2. As depicted, storage stack 300 comprises user mode application 302, file 304, volume 306, VHD 308, file system 310, and drive 312. Embodiments of the invention may operate with storage stacks that utilize more, or fewer of these layers (e.g., a storage stack where a second VHD is stored within VHD 308, or a storage stack that omits VHD 308 itself). Additionally, as used herein, these layers may be thought of as being above or "upper layers" relative to below or "lower layers."

In embodiments, each layer may contain a different mapping of byte ranges. That is a file (or particular portion of data) may be identified by a first set of byte ranges in one layer, and that same file may be identified by a second set of byte ranges in another layer. Commands to operate on data may identify the data by these byte ranges. Then, as these commands are sent from upper layers to lower layers, the upper layer may translate this byte range to the byte range that the lower layer uses to identify the data.

Figure 4:
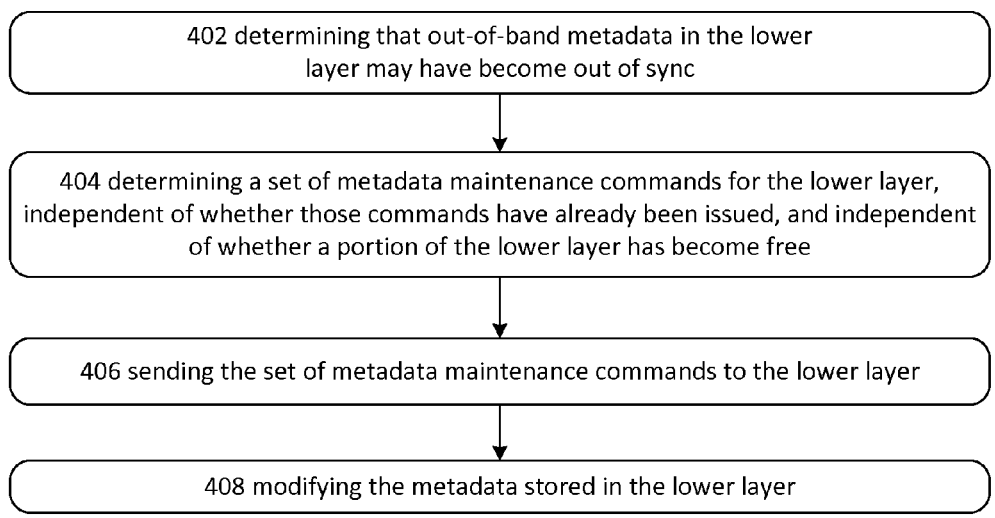
FIG. 4 depicts example operating procedures for re-establishing out-of-band metadata by re-issuing metadata maintenance commands from above layers.

FIG. 4 depicts example operating procedures for re-establishing out-of-band metadata by re-issuing metadata maintenance commands from above layers. The depicted operating procedures also include determining, by an upper layer, that out-of-band metadata of a lower layer may have been lost or otherwise become out-of-sync. In embodiments, the operating procedures of FIG. 4 may be implemented using the layers of storage stack 300 of FIG. 3. It may be appreciated that there are embodiments of the invention that do not implement all of the operations of FIG. 4, or that implement them in an order different from that depicted in FIG. 4.

Operation 402 depicts determining, that out-of-band metadata in the lower layer may have become out of sync. This operation may be performed by an upper layer. There are embodiments of the invention that operate where it is not certain that the out-of-band metadata is out of sync, but rather that the out-of-band metadata may have become out of sync. For instance, as described below, it may be determined that out-of-band metadata may have become out of sync after enough time has elapsed, so the operations of FIG. 4 are to be performed after that time period has elapsed. The following are ways that embodiments of the invention may determine that out-of-band metadata in a lower layer may have become out of sync.

Time-Based. An upper layer may determine that a lower layer's out-of-band metadata may be out of sync after a pre-determined amount of time has elapsed. That is, using a time-based approach may involve determining that a pre-determined amount of time has elapsed since the lower layer became present in the storage stack, or since the upper layer has last determined a different set of metadata maintenance commands for the lower layer.

Churn-Based. An upper layer may determine that a lower layer's out-of-band metadata may be out of sync after a pre-determined amount of I/O (input/output) activity directed toward lower layers has occurred. That is, using a churn-based approach may involve determining that a threshold amount of I/O activity directed toward the lower layer has occurred.

Metadata Epoch ID. An upper layer may query a metadata epoch ID from the layer below. Each layer may ensure that its epoch ID changes when a lower epoch ID changes (including being added or removed), and, and each layer may also ensure that if this change causes out-of-band metadata to drop out of sync with above layers, that this layer changes its epoch ID, even where no lower epoch IDs have changed. A layer capable of re-establishing out-of-band metadata by issuing commands to layers below may compare metadata epoch IDs previously obtained from the layer below, and if the newly obtained metadata epoch ID is different (including the layer below being added or removed), the layer that is performing the comparison has determined that the out-of-band metadata below may be out of sync (which may include being partially lost). An advantage of this approach is that re-establishment of metadata may be automatically restarted after a power failure during a previously ongoing re-establishment of out-of-band metadata, without help from additional mechanisms. A metadata epoch ID approach may involve determining, by the upper layer, that an identifier of an epoch for the lower layer has changed, the identifier of the epoch changing in response to the lower layer configuration being modified, or the lower layer being added or removed.

Upward Request from Lower Layers. A lower layer may send a request to a layer above that out-of-band metadata be re-established by the upper layer(s) re-sending commands to set out-of-band metadata to this lower layer. The request may be sent from the lower layer requesting this metadata, and propagated up through layers to upper layers. Upper layers may persist the fact that lower layer metadata is out of sync to maximize the chance that metadata will be re-established. That is, such an approach may involve receiving, by the upper layer, a request from the lower layer that out-of-band metadata for the lower layer be re-established.

Upon Adding a New Layer. A layer that is adding a new layer may initially assume that the new lower layer has out-of-sync metadata. An approach that is based on a new layer being added may involve determining that the lower layer has been added to the storage stack.

Upon Completion of a Metadata-Disrupting Operation. A layer performing an operation that may potentially disrupt continuous maintenance of metadata at lower layers may assume that, upon completion of the operation, metadata in lower layers is out of sync. Furthermore, the layer may persist the fact that lower layers may be out of sync before starting the operation, but postpone refresh of the lower metadata until the operation is not in progress (e.g., upon completion of the operation, after cancellation of the operation, or after a boot-up subsequent to a power failure that effectively cancels the operation). An approach that is based on a metadata-disrupting operation may involve determining, by the upper layer, that an operation on the lower layer has occurred that may potentially cause out-of-band metadata for the lower layer to become out of sync.

Upon Changing a Property of the Lower Layer. A property of a lower layer that may be changed includes changing a block size of the lower layer (e.g., from 32 MB slabs to 4 KB blocks, or vice versa), or changing an amount of mirroring of the lower layer. For example, the lower layer may originally have no mirroring of data, and then be modified to a RAID 1 (Redundant Array of Inexpensive Disks) scheme, where the layer maintains two copies of the data in a mirror configuration. An approach that is based on the mirroring change may involve determining that an amount of mirroring of data in the lower layer has increased. An approach that is based on a changing block size may involve determining that a block size of the lower layer has changed.

Operation 404 depicts determining a set of metadata maintenance commands for the lower layer, independent of whether those commands have already been issued, and independent of whether a portion of the lower layer has become free. This operation may be performed by an upper layer. Where the set of metadata maintenance commands (in embodiments, a single metadata maintenance command may be determined) are TRIM operations, this may be thought of as re-TRIMming. However, it is not necessary that the lower layer has already been TRIMmed. For instance, take the example where a lower layer has changed to add another storage device so that it now mirrors its data. These metadata maintenance commands of operation 404 may be sent to the lower layer and implemented on this newly added storage device, even though this newly added storage device in the lower layer may not have been TRIMmed before. Even though this new storage device has not previously been TRIMmed, these new TRIM commands may be sent to it, and these new TRIM commands may be considered a re-TRIM where a storage device has previously been TRIMmed. Additionally, while TRIM commands are typically sent in response to some data in the lower layer becoming free, this operation may be performed regardless of whether that data has recently become free.

In embodiments (such as some embodiments where the metadata maintenance commands are TRIM operations), operation 404 is implemented by utilizing a free space map of the lower layer that is maintained by the upper layer. That is, operation 404 may comprise determining the set of metadata maintenance commands based on free space identified in a free space map of the lower layer that is maintained by the upper layer.

In embodiments, a layer does not directly store information about metadata maintenance commands. For instance, an upper layer may not store information about TRIMs of a lower layer. However, the upper layer may have a free space map for the lower layer, which identifies which portions of the lower layer the upper layer considers to be free and which portions of the lower layer the upper layer considers to be in use. So, even where the upper layer lacks a record of which TRIMs have been sent to the lower layer, the upper layer may use this free space map to determine which TRIM commands to send, by sending TRIM commands corresponding to the free space in the free space map.

One way to do this involves moving a file (or data) through the free space in the free space map. As this file is moved, the upper layer may utilize an API (application programming interface) call that sends TRIM commands corresponding to this new free space—a TRIM command may be sent which applies to the portion of the storage device that the file was moved from (in embodiments, these TRIM commands are not sent each time the file is moved, but collected into TRIM commands that identify larger contiguous portions of the storage device). That is, in such embodiments, operation 404 may comprise moving a file into, and then moving a file out of, the free space of the lower layer as identified in the free space map; and sending a TRIM command to the lower layer corresponding to the free space, based on the moves out of the free space of the lower layer. Moving a file into and then out of a portion of the free space need not involve any writing to the payload of the file, and need not involve any flushing of file metadata to disk. In some cases, it may not even involve issuing any file metadata writes (or far fewer than the number of times the file was moved into and then out of a portion of free space).

In embodiments, it may be that a small number of TRIMs are missed, because other file system operations are occurring while moving this file through the free space map, that cause otherwise free space to be considered to be in use.

In addition to re-establishing the metadata maintenance commands of a TRIM map, other metadata maintenance commands may also be re-established. For instance, a layer may maintain a "heat map"—an indication of which portions of a lower layer (e.g., which offsets) should be kept in a more accessible portion of the storage device (e.g., in a buffer of the storage device that has a quicker access time than the rest of the device; this is sometimes referred to as a "closer level of memory" for that layer). The upper layer may re-establish the metadata maintenance commands for the heat map by re-issuing indications of which portions of the lower layer should be kept in a more accessible portion of the storage device. That is, in embodiments wherein the out-of-band metadata comprises a heat map, operation 404 may comprise determining a command to indicate to the lower layer to keep the portion of the lower layer in the more accessible portion of the lower layer.

Similar operations may be implemented from within database files. For instance, SQL (Structured Query Language) processes may be configured to send TRIMs on SQL data files. A database may be stored outside of a file system. In some scenarios, a database may be stored directly on a storage device. Additionally, the internal structure of a database may be different from a file system. For instance, rather than being based on files, the database may be based on data items, or something more advanced than files. In such cases, free space may be re-trimmed even in the absence of a file system, and similarly other metadata of a lower layer may be established or re-established based on information in the database layer, even if that information has not changed recently (in contrast to an example such as deletion of an item triggering a TRIM).

Multiple layers may initiate commands that set metadata, and multiple layers may handle commands that set metadata. For example, take a virtual machine (VM) scenario, where the VM has a virtual hard drive (VHD). The VM may be sending down a TRIM. The VHD layer may determine that it will process the TRIM command for some portion of the range specified in the TRIM command, and determine that it will send the other portion of the range specified in the TRIM command to a lower layer. The VHD layer may effectively be taking an upper layer TRIM and sending down other TRIMs based on it (perhaps a different number of TRIMs that identify different offsets, those different offsets corresponding to the lower layer that will receive those additional TRIMs).

When a layer's configuration changes, or the presence of that layer changes, the out-of-band metadata after that change is not necessarily optimal for the new configuration (it may be slightly or completely out of sync). For instance, the old layer may be unable to fully implement a property, and the new one can fully implement that property. Another example involves the layer changing from being composed of 32 MB slabs for data to 4 KB pages of data (or, more generally stated, from a known size to an unknown size, or vice versa). The metadata that identifies only which slabs are free may not capture any free pages found within a former slab that is only partially free. Also, it may be onerous for the old configuration to retain out-of-band metadata at maximum fidelity even where the old configuration has no use for the full fidelity information (e.g., it may be onerous to retain TRIM commands for 4 KB pages when the old configuration is implemented on 32 MB slabs). Where a VHD parser receives high-resolution TRIMs that identify TRIMs as small as 4 KB, but has a block size of 32 MB, the VHD parser may not keep track of the TRIMs themselves, but rather just know whether any 32 MB blocks are gone. Those other TRIMs did happen, but it may be problematic to keep track of them—it may require performing extra write operations just to keep track of them. Rather than keeping track of the TRIMs themselves, the free space map in the VM already has that information, so it may be parsed for TRIM commands to send down to lower layers that implement those TRIM commands.

Rather, in embodiments of the present invention, the above layers may re-establish out-of-band metadata by re-translating from layer-specific information to out-of-band metadata commands that are issued to below layers. For example, a number of small TRIM commands issued over time may collectively cover an entire 32 MB slab, but the layer may not notice this fact at the time, and the tracking necessary for the layer to notice may be overly complex. That is, many smaller TRIMs may be received that add up to TRIMming out the whole 32 MB block. These TRIMs get forwarded down, but the layer that forwards them down may not realize that the whole block is allowed to be TRIMmed.

However, when an above layer re-TRIMs, the above layer may see that there is this bigger area that may be expressed as a single TRIM. Instead, embodiments of the invention may have the layer rely on the layer above to re-TRIM, since the layer above is already tracking its free space and translating from (and synchronizing with) its free-space tracking data structures (such as a free space map), and sending down TRIM commands that are as large as possible (or, collecting together multiple smaller TRIMs), or TRIMs that are aligned to slab boundaries than prior smaller incremental TRIMs were. An upper layer may determine that out-of-band metadata for a lower layer may be out of sync using a variety of techniques. Once the upper layer has made such a determination, the upper layer may re-establish this lost out-of-band metadata by re-issuing commands to set this out-of-band-metadata. These techniques for determining that out-of-band metadata for a lower layer may be out of sync may be used in combination with each other.

In embodiments, each layer may maintain a separate addressing scheme to identify data in its layer. This addressing scheme may include identifying particular data by a byte range, with each layer possibly using a different byte range to identify that data within its own layer. In such embodiments, determining, by the upper layer, the set of metadata maintenance commands for the lower layer may comprise translating a byte range from an address space in the upper layer to an address space in the lower layer, the set of metadata maintenance commands identifying the byte range in the address space in the lower layer.

Operation 406 depicts sending the set of metadata maintenance commands to the lower layer. In embodiments, this operation may be performed by the upper layer. For instance, where the metadata maintenance commands are TRIM commands, operation 406 may comprise sending those TRIM commands from the upper layer to the lower layer. For instance, where the metadata maintenance commands involve implementing a heat map, operation 406 may comprise sending instructions from the upper layer to the lower layer for the lower layer to keep certain data stored in its more easily accessible storage.

Operation 408 depicts modifying the data and/or metadata stored in the lower layer. In embodiments, this operation may be performed by the lower layer, and performed in response to receiving the set of metadata maintenance commands. For instance, where the metadata maintenance commands are TRIM commands, operation 408 may comprise the lower layer implementing those TRIM commands by trimming logical ranges of the lower layer, by the lower layer, based on the TRIM commands, or by logically erasing portions of the data stored in the lower layer, by the lower layer, based on the metadata maintenance commands. Operation 408 may comprise the lower layer updating internal metadata tracking structures, by modifying its internal metadata. Where the metadata maintenance commands involve implementing a heat map, operation 408 may comprise the lower layer moving certain data to more easily accessible storage and/or ensuring that certain data in the more easily accessible storage remains in the more easily accessible storage.

In embodiments, the lower layer may not implement all of the commands by modifying the data stored in its own layer, but forward some (or all) of those commands to an even lower layer. The lower layer may first determine a first portion of the set of metadata maintenance commands to be implemented by the lower layer, as well as a second portion of the set of metadata maintenance commands to be implemented by a layer below the lower layer. For that first portion of commands that are to be implemented on the lower layer itself, the lower layer may implement on the lower layer the first portion of the set of metadata maintenance commands to modify the data and/or metadata stored in the lower layer based on the first portion of the set of metadata maintenance commands.

The lower layer may also send the second portion of the set of metadata maintenance commands to the layer below the lower layer. That layer below the lower layer may modify the data and/or metadata stored in the layer below the lower layer, in response to receiving the second portion of the set of metadata maintenance commands.

Figure 5:
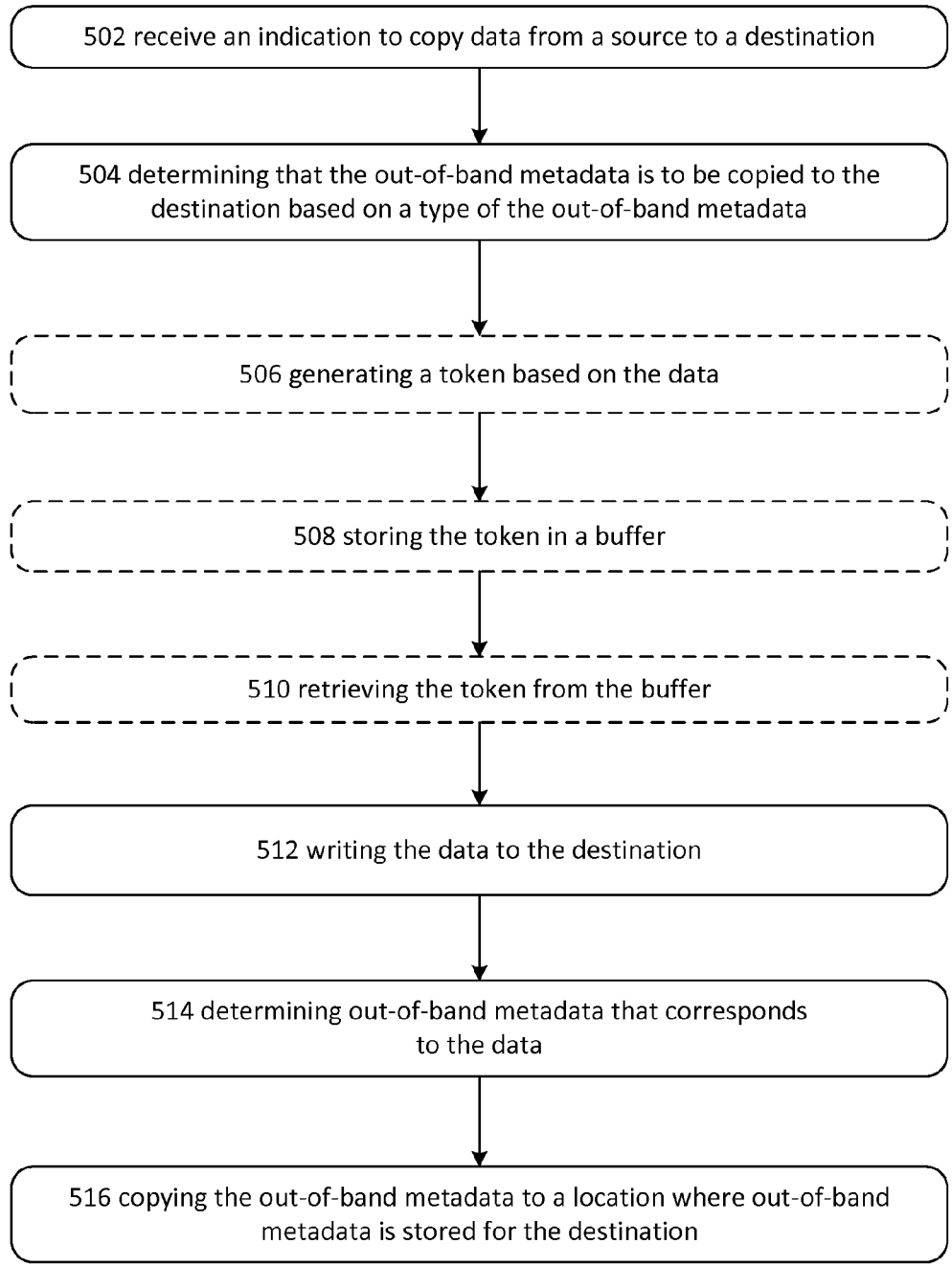
FIG. 5 depicts example operating procedures for applying out-of-band metadata from a source to a destination during an offload copy operation.

FIG. 5 depicts example operating procedures for applying out-of-band metadata from a source to a destination during an offload copy operation. The depicted operating procedures also include applying token-based copy offload to items, as opposed to sectors. Here, applying token based copy offload to items instead of sectors is an improvement over the prior art even if the metadata that moves along with the token is the empty set. In embodiments, the operating procedures of FIG. 5 may be implemented using the layers of storage stack 300 of FIG. 3. It may be appreciated that there are embodiments of the invention that do not implement all of the operations of FIG. 5, or that implement them in an order different from that depicted in FIG. 5. For instance, item-based copying embodiments may not implement operations 506-510, which involve the use of a token (operations 506-510 are depicted with a dashed line to identify their status as optional).

When servicing a copy request or an offload write request, applicable range-based metadata may also be copied from the source to a destination (or in the case of an offload write request, logically copied from the data and metadata represented by the token to the destination). Put another way, range-based metadata may be copied along with its corresponding payload data. There may be instances where embodiments do not desire to copy applicable range-based metadata. For instance, where a backup is being made that will not be in active service, embodiments may determine not to copy the heat map metadata to that backup.

A layer with out-of-band metadata may have no direct way of knowing that a conventional copy is occurring, since the layer may only see the copy as a read, followed some time later by a write. The data in those read and write operations may happen to match, but correlating write with the previous read may pose problems, and even if it is correlated, matched data is not guaranteed to indicate a semantic copy of that data. Where the data matches but is not a copy, it may be that the metadata is not applicable to this newly written version of the matched data (e.g., a heat map of the old matched data does not apply to the new matched data).

However, copy offload (whether token-based, XCOPY-based, or otherwise) informs the layer of the logical copy operation, such that the layer is made directly aware of the copy from source to destination (or logically from source to token and then logically from token to destination). Previous implementations of copy offload only conveyed the data contents. However, embodiments of the present invention allows for the copying of any out-of-band metadata from the source to destination along with the data, as appropriate. There may be types of out-of-band metadata that are not copied, such as out-of-band metadata that is intended to be permanently associated with only a single logical disk offset, but other types of out-of-band metadata such as TRIM/unmap information may make sense to copy at some level of fidelity from source to destination. Examples of out-of-band metadata that might not be applied to the destination are out-of-band logical disk security settings, and out-of-band data mirroring settings (or similar, for purposes of data preservation rather than performance).

Embodiments of the invention involve token-based offload copy of items, as opposed to sectors. For example, where an item is copied within a database, a database implementation may simply increment the refcount for that item and add an additional pointer for the destination of the copy. There are other formats that deal in terms of items rather than byte ranges. Take an example of copying a photo using offload copy. What is sent from the upper layer to the lower layer is not a request for a copy of the photo, but a request for a token useable to effect a write to a useable destination. In an offload copy, instead of using buffered write operations, the copy operation is initiated with an offload read, and a token is retrieved that represents the data from the storage device. Then, an offload write command that identifies the token is used to request data movement from the source storage area to the destination storage area. The copy manager performs the logical data copying. This form of offload copying may significantly reduce client-server network traffic and CPU time usage during large transfers because all the data movement is performed at the backend storage network.

A token-based copy offload as applied at the item-level of granularity (as opposed to the sector-level of granularity) may be implemented as follows. The offload request may include a representation of which item(s) are to be copied, or which portions of each item to include in the token. For example, this may be thought of a scoped immutable snapshot of a (possibly relatively small) portion of a database. In embodiments where data is copied from a source to a destination, the source may comprise a source storage stack, and the destination may comprise a holding area associated with a token. In other such embodiments, the source may comprise the holding area associated with the token, and the destination may comprise a destination storage stack.

In embodiments, the offload write may then take a representation of a sub-portion of the token to logically write to the destination. In other embodiments, the offload write may take the entire token, when no such representation of a sub-portion is provided. Additionally, the initiator of the offload write may provide new IDs for the newly written items.

An example of such a token-based copy offload is a directory-level writeable clone returned from one logical file system namespace and spliced into a new location in a different logical file system namespace that has different security principles (but where the overall operation is as secure as a conventional read/write would have been). Another example of such a token-based copy offload is a database operation where a template item may be logically cloned without needing to read and then write the item, and without needing to perform the clone as a single operation (so, the logical read and write could be separated).

Operations other than copy may also still apply in this item-based form of token-based offload, and each operation may still use immutable inputs (where these tokens represent scoped immutable things). Examples of these operations include a logical copy from a token into RAM, or data transformation from the input token to a new immutable output token created as an output of the transformation.

Operation 502 depicts receiving an indication to copy data from a source to a destination. In embodiments, the source is a lower layer of a storage stack of a computer system, where the storage stack comprises an upper layer that maintains out-of-band metadata for the lower layer. The offload read response to this offload request may return a token that represents at least a portion of the requested information, without including a representation of any information outside of the requested scope. This response is described in more detail with respect to operation 506.

Operation 504 depicts determining that the out-of-band metadata is to be copied to the destination based on a type of the out-of-band metadata. In embodiments, operation 504 may comprise determining that the out-of-band metadata comprises information for TRIM commands, information for unmap commands, or information for data de-duplication hashes. In embodiments, operation 504 may also comprise determining that the out-of-band metadata is to be copied to the destination based a type of the destination. For instance, where the type of destination is a storage device that will serve as a mirror of the source, and be actively used to read from, it may be determined that out-of-band metadata is to be copied from the source to the destination.

Examples of out-of-band metadata which might be applied to the destination include TRIM/unmap information, and data-de-duplication hashes. Examples of out-of-band metadata which might be applied in some situations and might not be applied in other situations include data access heat maps, data replication hints (originally applied for performance reasons), and data tier-ing hints. For these types of metadata, an indication from the initiator as to whether the destination will be used for approximately the same purpose as the source can be conveyed to the layer as part of an offload command (for example, offload read, or offload write), to enable the layer to determine whether to copy out-of-band metadata of this nature. To preserve appropriate out-of-band metadata across the logical copy operation, the layer is augmented to apply out-of-band metadata from the source to the destination, for ranges specified by the logical copy operation. The layer may do this even if the layer offloads the copying of main payload data to lower layers (even if this layer just forwards the logical copy operation to layers below, for the main data). In embodiments, the application of out-of-band metadata from source to destination may not be a perfect copy of the source out-of-band metadata. For example, similar to the loss of fidelity/resolution that can occur while processing TRIM commands from above, a logical copy that preserves TRIM/unmap information from a source to a destination may still result in slightly non-optimal (slightly out-of-sync) TRIM information at the destination if the destination slab size is smaller than the source slab size—but the resulting destination TRIM information derived from source TRIM information may still be better than no TRIM information being preserved across the copy.

In embodiments, it may be determined not to copy out-of-band metadata of the data when copying the second data, based on a type of the out-of-band metadata and/or and a type of the destination. For example, the type of the out-of-band metadata may be a heat map, and the type of the destination may be a backup storage device that will not actively be used. In such an example, it may be that there is little effect to applying the heat map to the backup storage device, since the heat map will have likely changed significantly by the time that the backup storage device is brought to use as an active storage device that is frequently processing read requests.

Operation 506 depicts generating a token based on the data. In embodiments, the token comprises a cryptographically-secure string of bits. Relevant out-of-band metadata snapped from the source at the time of the offload read may be logically included in the token. A token may comprise a representation or proxy of a chunk of immutable data. The token may be expressed as a cryptographically secure/random number, and may also contain space for other features, like tagging or extra addressing. In an embodiment, the token may be 512 bytes in size.

In embodiments, the token itself may include out-of-band metadata for the data identified by the token. Inclusion of out-of-band metadata in the token may also accelerate the overall offload read/write sequence. For example, if a significant portion of the token is TRIMmed/unmapped, an offload write implementation may avoid doing physical writing for those ranges of the token even if the offload write implementation would otherwise normally need to perform physical writing during an offload write, or avoid allocating physical storage space if an intermediate layer would otherwise need to allocate physical storage space to back the destination ranges specified by an offload write.

These tokens may be considered different from file handles. Tokens may represent scoped immutable things, and are a cryptographically difficult-to-guess data value that may act as a secure proxy for the scoped immutable things. Additionally, tokens are transient, in that they may be passed between processes, and across system boundaries, whereas use of a file handle is restricted to the process that was assigned that file handle. A token also allows for the decoupling of the logical reader and the logical writer when the token is used for copying data, or the decoupling of the token creator and potentially multiple token users when used for more general operations, whereas a file handle lacks these features. A difference between a token and a file handle, is that a file handle is easily guessable and may be used only within the process that has the handle. In contrast, a token is a cryptographically unguessable string that represents immutable data of an arbitrary size.

Operation 508 depicts storing the token in a buffer. During a more conventional copy, bulk data may be read into a buffer, then written from the buffer to the destination. In contrast, during an offload copy, a token that identifies the copied data may be stored in a small buffer, then perform an offload write that identifies the token. The storage target for the copy uses the token to identify the data and writes the data as if it were writing the data normally. Then, the relevant out-of-band metadata may be logically applied from the token to the destination at the time of the offload write.

Operation 510 depicts retrieving the token from the buffer. In embodiments, operation 508 is performed by a storage layer below in the source storage stack (sometimes referred to as an "offload provider") that operates to write data to the destination. In embodiments, retrieving the token from the buffer may be performed by a storage layer below in the destination storage stack. This may be thought of as analogous to a conventional read/write. In embodiments, the storing and retrieving may be performed via a DMA (direct memory access) transfer.

Operation 512 depicts writing the data as identified by the token to the destination. In embodiments, operation 512 is performed by the same process that implements operation 510. In other embodiments, the upper layers of the destination storage stack will read the token and forward it to lower layers of the destination storage stack, and at some point a layer will retrieve the token from the buffer used to pass the token from the layer above to the current layer, and will implement the offload write command and get the data written. The manner in which a token may be passed down a stack in contrast to the way normal data may be passed down a stack—normal data is usually big enough to go to some trouble avoiding any extra copying, while a token is usually small enough that it may be copied a few times without causing any performance issues. In some embodiments, the offload provider may do physical writing of the copied data, and in other embodiments, the offload provider may increment the reference count ("refcount") of the data to make it appear as it has been copied (e.g., the physical storage LBA may have two separate incoming pointers to the same data, so from the perspective of the two logical LBAs that point to the same physical storage LBA, there are two copies of the data). In some embodiments the reference count is implicit rather than being an explicitly tracked number, and garbage collection of no-longer-referenced physical storage LBAs may be the mechanism used to detect a reference count of zero. If the backing data for the token includes both the bulk data and the TRIM map for the token, embodiments of the invention may avoid writing the TRIMmed portions. Rather, these embodiments may just update their TRIM map, which may be faster. So, even if an embodiment does not implement a refcount scheme, the embodiment may still accelerate the write operation by utilizing the TRIM map.

Operation 514 depicts determining out-of-band metadata that corresponds to the data identified in the token. In embodiments, operation 514 may be performed by an upper layer relative to the source. In embodiments, the upper layer may identify the data subject to the copy based on it being identified in the data structures backing the token. Then the upper layer may determine corresponding out-of-band metadata. For instance, where the out-of-band metadata corresponds to TRIM commands, the upper layer may check the portion of a free space map for the source (when the source has not been modified since the token was created). The upper layer may check the portion of this free space map that corresponds to the copied source data to see which portions of that copied source data are free, or should have TRIM commands issued to them at the destination.

Operation 516 depicts copying the out-of-band metadata to a location where out-of-band metadata is stored for the destination. In embodiments, operation 516 may be performed by an upper layer relative to the source. In embodiments, operation 516 comprises copying, by the copy provider, the out-of-band metadata to a lower layer of a second storage stack, the logical destination comprising an upper layer of the second storage stack. In embodiments, the copy provider will be reachable as a layer of the source storage stack, and also reachable as a layer of the destination storage stack. In embodiments, operation 516 comprises updating destination metadata appropriately based on source metadata in a lower layer, wherein the indication to copy data is issued to an upper layer.

When used in combination with token-based copy offload, embodiments of the invention are for the offload read to logically copy both in-band data and corresponding out-of-band metadata from the source into a holding area associated with the token, and for the offload write to logically copy at least a portion of in-band data and corresponding out-of-band metadata from the holding area associated with the token to the destination. Stated more generally, embodiments of the invention copy metadata along with the data, and for token-based offload, this copying will be once from the source into the token, and then separately from the token to the destination. The token logically holds immutable data and immutable metadata, and that may be achieved in a variety of ways.

CONCLUSION

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media, which do not include signals, and/or computer-readable communication media. Thus, the invention, or certain aspects or portions thereof, may take the form of program code (i.e., instructions) embodied in tangible, or non-transitory, media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for re-establishing out-of-band metadata in a lower layer of a storage stack of a computer system, the storage stack comprising an upper layer and the lower layer, comprising:
   determining, by the upper layer, a probability that out-of-band metadata in the lower layer has become out of sync with the upper layer;
   determining, by the upper layer, based at least in part on the probability that out-of-band metadata in the lower layer has become out of sync, a set of metadata maintenance commands for the lower layer, wherein the set of metadata maintenance commands are sent independent of whether those commands have already been issued, and independent of whether a portion of the lower layer has become free;
   sending, by the upper layer, the set of metadata maintenance commands to the lower layer; and
   modifying, by the lower layer, at least one of the data and the metadata stored in the lower layer, in response to receiving the set of metadata maintenance commands.

2. The method of claim 1, where the metadata maintenance commands comprise TRIM operations, and wherein determining the set of metadata maintenance commands comprises:
   determining the set of metadata maintenance commands based on free space identified in a free space map of the lower layer that is maintained by the upper layer.

3. The method of claim 2, wherein determining the set of metadata maintenance commands comprises:
   allocating and then deallocating ranges from free space of the lower layer as identified in the free space map; and
   sending a TRIM command to the lower layer corresponding to the free space, based on deallocating ranges in free space of the lower layer.

4. The method of claim 1, wherein the upper layer is implemented on the lower layer, and wherein out-of-band metadata comprises:
   metadata stored on the upper layer, where corresponding payload data is stored on the lower layer without being stored on the upper layer; and
   metadata stored on the lower layer in a different physical location than corresponding payload data stored on the lower layer.

5. The method of claim 1, wherein determining, by the upper layer, a probability that out-of-band metadata in the lower layer has become out of sync, comprises at least one of:
   determining that a pre-determined amount of time has elapsed since the lower layer became present in the storage stack, or since the upper layer has last determined a different set of metadata maintenance commands for the lower layer;
   determining that a threshold amount of input/output (I/O) activity directed toward the lower layer has occurred;
   determining, by the upper layer, that an identifier of an epoch for the lower layer has changed, the identifier of the epoch changing in response to the lower layer configuration being modified, or the lower layer being added or removed;
   receiving, by the upper layer, a request from the lower layer that out-of-band metadata for the lower layer be re-established;
   determining that the lower layer has been added to the storage stack;
   determining, by the upper layer, that an operation on the lower layer has occurred that may potentially have caused out-of-band metadata for the lower layer to become out of sync;
   determining that an amount of mirroring of data in the lower layer has increased; or
   determining that a block size of the lower layer has potentially changed,
      wherein, determining that the block size has changed from a known value to an unknown value, or to from an unknown value to a known value.

6. The method of claim 1, wherein the out-of-band metadata comprises a heat map that indicates a portion of the lower layer to be kept in a more accessible portion of the lower layer, and wherein determining the set of metadata maintenance commands for the lower layer comprises:
   determining a command to indicate to the lower layer to keep the portion of the lower layer in the more accessible portion of the lower layer.

7. The method of claim 1, wherein determining, by the upper layer, the set of metadata maintenance commands for the lower layer comprises:
   translating a byte range from an address space in the upper layer to an address space in the lower layer, the set of metadata maintenance commands identifying the byte range in the address space in the lower layer.

8. The method of claim 1, wherein modifying, by the lower layer, at least one of the data and the metadata stored in the lower layer, in response to receiving the set of metadata maintenance commands comprises:
   determining, by the lower layer, a first portion of the set of metadata maintenance commands to be implemented by the lower layer, and a second portion of the set of metadata maintenance commands to be implemented by a layer below the lower layer;
   implementing, by the lower layer and on the lower layer, the first portion of the set of metadata maintenance commands;
   modifying, by the lower layer, at least one of the data and the metadata stored in the lower layer based on the first portion of the set of metadata maintenance commands;

sending, by the lower layer, the second portion of the set of metadata maintenance commands to the layer below the lower layer; and modifying, by the layer below the lower layer, at least one of the data and the metadata stored in the layer below the lower layer, in response to receiving the second portion of the set of metadata maintenance commands.

9. The method of claim 1, wherein the set of metadata maintenance commands comprise TRIM commands, and wherein modifying, by the lower layer, at least one of the data and the metadata stored in the lower layer, in response to receiving the set of metadata maintenance commands comprises:

trimming logical ranges of the lower layer, by the lower layer, based on the metadata maintenance commands.

10. A computer-readable storage medium, excluding signals per se, for re-establishing out-of-band metadata in a lower layer of a storage stack comprising an upper layer and that lower layer, bearing computer-executable instructions that, when executed on a computer, cause the computer to perform operations comprising:

determining, by the upper layer, a probability that out-of-band metadata in the lower layer has become out of sync with the upper layer;

determining, by the upper layer, based at least in part on the probability that out-of-band metadata in the lower layer has become out of sync, a set of metadata maintenance commands for the lower layer, independent of whether those commands have already been issued, and independent of whether a portion of the lower layer has become free;

sending, by the upper layer, the set of metadata maintenance commands to the lower layer; and modifying, by the lower layer, at least one of the data and the metadata stored in the lower layer, in response to receiving the set of metadata maintenance commands.

11. The computer-readable storage medium, excluding signals per se, of claim 10, wherein determining, by the upper layer, a probability that out-of-band metadata in the lower layer has become out of sync, comprises:

determining that a pre-determined amount of time has elapsed since the lower layer became present in the storage stack, or since the upper layer has last determined a different set of metadata maintenance commands for the lower layer.

12. The computer-readable storage medium, excluding signals per se, of claim 10, wherein determining, by the upper layer, a probability that out-of-band metadata in the lower layer has become out of sync, comprises:

determining that a threshold amount of input/output (I/O) activity directed toward the lower layer has occurred.

13. The computer-readable storage medium, excluding signals per se, of claim 10, wherein determining, by the upper layer, a probability that out-of-band metadata in the lower layer has become out of sync, comprises:

determining, by the upper layer, that an identifier of an epoch for the lower layer has changed, the identifier of the epoch changing in response to the lower layer configuration being modified, or the lower layer being added or removed.

14. The computer-readable storage medium, excluding signals per se, of claim 10, wherein determining, by the upper layer, a probability that out-of-band metadata in the lower layer has become out of sync, comprises:

receiving, by the upper layer, a request from the lower layer that out-of-band metadata for the lower layer be re-established.

15. The computer-readable storage medium, excluding signals per se, of claim 10, wherein determining, by the upper layer, a probability that out-of-band metadata in the lower layer has become out of sync, comprises:

determining that the lower layer has been added to the storage stack.

16. The computer-readable storage medium, excluding signals per se, of claim 10, wherein determining, by the upper layer, a probability that out-of-band metadata in the lower layer has become out of sync, comprises:

determining, by the upper layer, that an operation on the lower layer has occurred that may potentially have caused out-of-band metadata for the lower layer to become out of sync.

17. The computer-readable storage medium, excluding signals per se, of claim 10, wherein determining, by the upper layer, a probability that out-of-band metadata in the lower layer has become out of sync, comprises:

determining that an amount of mirroring of data in the lower layer has increased.

18. The computer-readable storage medium, excluding signals per se, of claim 10, wherein determining, by the upper layer, a probability that out-of-band metadata in the lower layer has become out of sync, comprises:

determining that a block size of the lower layer has potentially changed.

19. The computer-readable storage medium, excluding signals per se, of claim 18, wherein determining that the block size of the lower layer has potentially changed comprises:

determining that the block size has changed from a known value to an unknown value, or to from an unknown value to a known value.

20. A system for re-establishing out-of-band metadata in a lower layer of a storage stack comprising an upper layer and that lower layer, wherein the upper layer is implemented on the lower layer, comprising:

a processor; and a memory communicatively coupled to the processor when the system is operational, the memory bearing processor-executable instructions that, when executed on the processor, cause the system at least to:

determine, by the upper layer, a probability that out-of-band metadata in the lower layer has become out of sync with the upper layer;

determine, by the upper layer, based at least in part on the probability that out-of-band metadata in the lower layer has become out of sync, a set of metadata maintenance commands for the lower layer, independent of whether those commands have already been issued, and independent of whether a portion of the lower layer has become free;

send, by the upper layer, the set of metadata maintenance commands to the lower layer; and modify, by the lower layer, at least one of the data and the metadata stored in the lower layer, in response to receiving the set of metadata maintenance commands.

* * * * *